Figure 1:
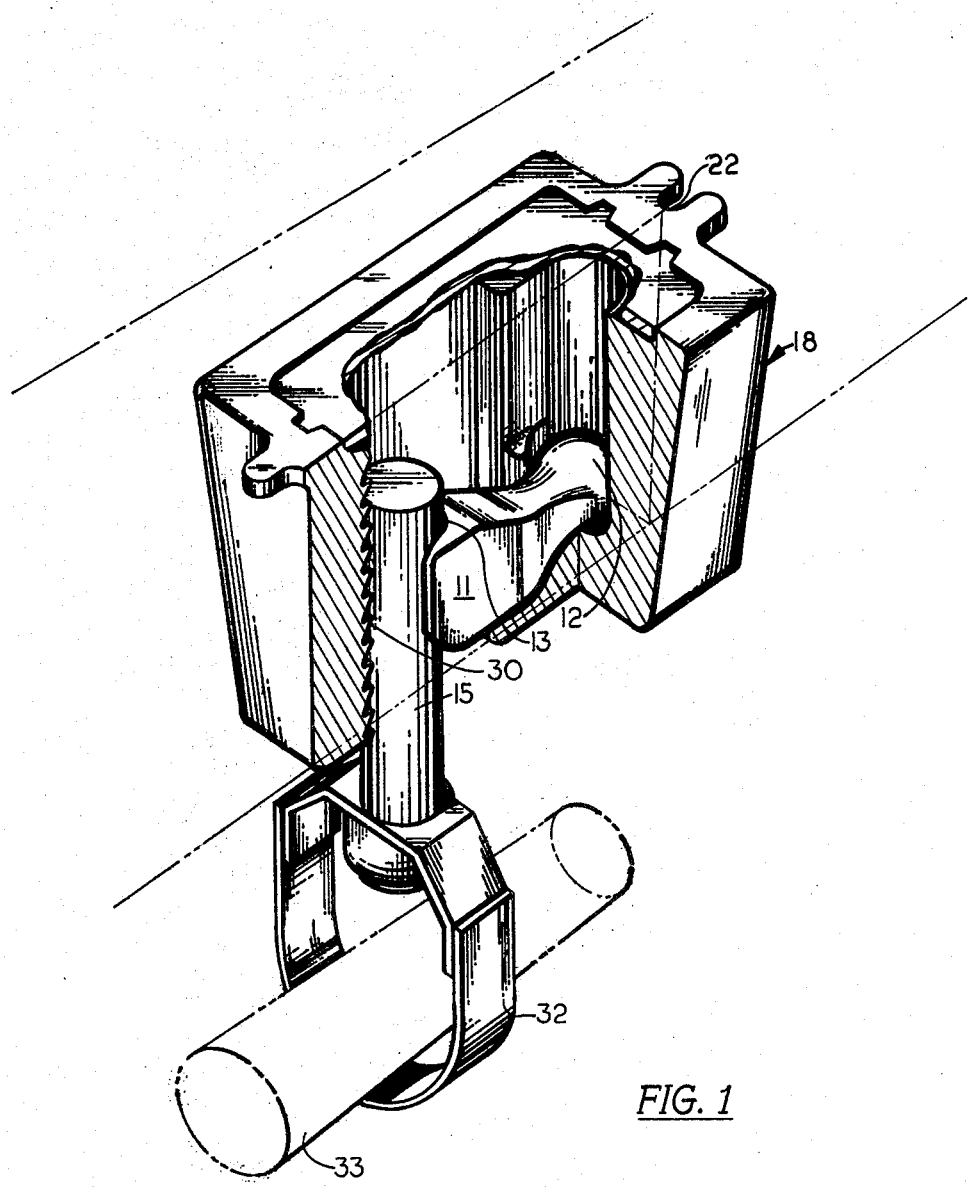

INVENTOR.
JOHN W. CARNER
BY
ATTORNEY

INVENTOR.
JOHN W. CARNER

Feb. 23, 1965   J. W. CARNER   3,170,664
SUPPORT CLAMP

Filed May 13, 1963   3 Sheets-Sheet 3

INVENTOR.
JOHN W. CARNER
BY
Edward A. Sohololu
ATTORNEY

United States Patent Office 3,170,664
Patented Feb. 23, 1965

3,170,664
SUPPORT CLAMP
John W. Carner, 1518 Walgrove, Los Angeles 66, Calif.
Filed May 13, 1963, Ser. No. 279,809
8 Claims. (Cl. 248—59)

This invention relates to a support clamp and more particularly to such a device in which wedge type clamping action is achieved by means of one or more freely mounted jaws.

In the construction industry it is often necessary to suspend a large number of support members from the overhead structure, such support members being used to carry plumbing lines, electrical wiring and the like. Such support members are often suspended by means of wires, rods, or devices which require a certain amount of labor to install. A wire suspension is for example, threaded through a hole in a cross beam and then twisted to hold it in place, or a threaded suspension rod may be attached to a cross beam by means of a locking nut which must be tightened down to achieve proper attachment. While the individual operations involved in this type of attachment may in each instance be relatively simple and require only several minutes or so, when such individual operations are multiplied by the many thousands of times they must be performed in a typical construction project, they considerably increase the time and the cost of labor involved.

The device of this invention overcomes the shortcomings of prior art suspension attachment devices by providing a simple locking clamp by means of which a suspension rod can be suspended from the support structure with a wedge-like locking attachment. Such wedge-like attachment to the suspension rod is achieved with a minimal effort by merely inserting the rod into a locking mechanism and when it has been inserted into the locking mechanism pulling the rod away therefrom to lock it in place. This end result is achieved by utilizing one or more locking jaws which are freely mounted within a casing which is attached to the support or supporting member. One end of each jaw abuts against the walls of the casing, while the other end engages the support rod. When the rod is inserted into the casing in the vicinity of the clamping or engaging side of the jaw, the jaw is displaced so that the end thereof which abuts against the rod moves with the rod. In a first embodiment having a single jaw, when the rod is pulled away from the casing, its opposite walls abut against a wall of the casing and the end of the jaw respectively both of which have serrations formed therein. As the jaw is drawn with the rod, wedge-like locking action is achieved with the jaw jamming the rod tighter and tighter against the side of the casing as the rod is pulled further away therefrom. Thus, extremely tight locking action is achieved with a minimal expenditure of time and labor. In a second embodiment of the invention utilizing two or more jaws, the walls of the rod abut against the ends of the jaws which are serrated while the opposite sides of the jaws abut against the casing walls. Locking action is achieved as the rod is pulled away from the casing with the jaws sliding along the casing walls with the rod.

It is therefore an object of this invention to provide an improved support clamp.

It is a further object of this invention to provide a support clamp which can be utilized with a minimal expenditure of time and labor.

It is still a further object of this invention to facilitate the suspension of support members.

It is still another object of this invention to provide an improved suspension clamp utilizing a freely mounted jaw member operating in conjunction with a casing.

Figure 2:
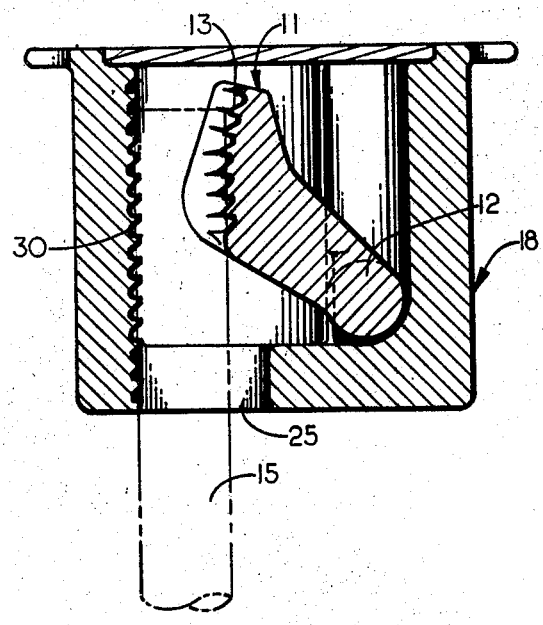
Figure 3:
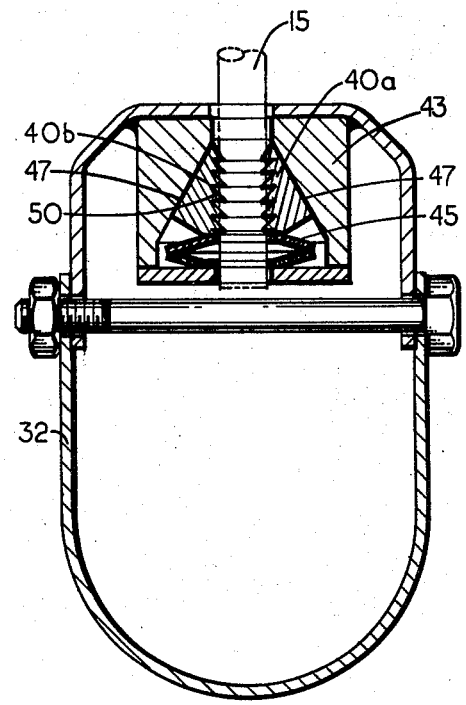
Figure 4:
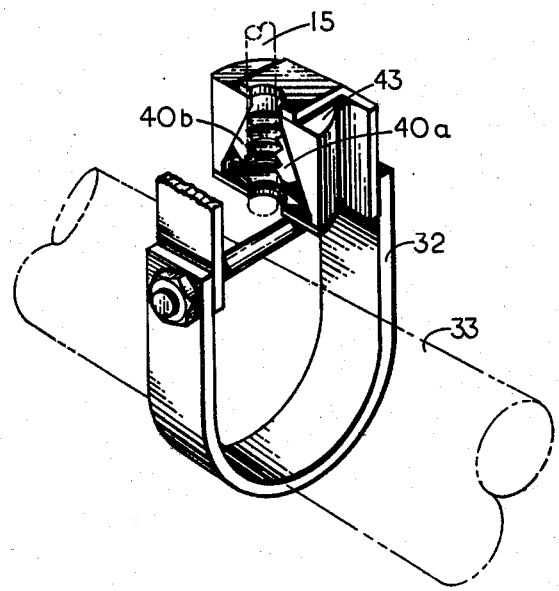

Other objects of this invention will become apparent from the following description taken in connection with the accompanying drawings of which FIG. 1 is a perspective view with partial cutaway section of a first embodiment of the device of the invention, FIG. 2 is a cross sectional view of the embodiment shown in FIG. 1, FIG. 3 is a cross sectional view of a second embodiment of the device of the invention illustrated in conjunction with a hanger bracket, and FIG. 4 is a perspective view with partial cutaway section of the embodiment shown in FIG. 3.

Referring now to FIGS. 1 and 2 a first embodiment of the device of the invention is illustrated. Casing 18 is attached to an overhead support beam (not shown) by means, for example, of nails which fit through slots 22. Jaw member 11 has one end thereof 12 which is ball shaped and an opposite end thereof 13 which is hollowed to mate with the walls of rod 15. The surface of hollowed end 13 is serrated to provide locking action when it abuts against the walls of the rod. Jaw 11 is freely retained within casing 18, not being attached thereto, with ball shaped portion 12 abutting against an inner wall of the casing which is curved to mate therewith.

In connecting a rod 15 to the casing 18 and thereby to the beam (not shown) to which such casing is attached, the rod is first inserted into the aperture 25 at the bottom of the casing as shown in FIG. 2. This pushes end 13 of the jaw upward as shown in FIG. 2. When rod 15 is then drawn downward as shown in FIG. 1, the serrations at the end 13 of the jaw grab the rod and this end of the jaw tends to be drawn downward with the rod. This tightly wedges rod 15 between the jaw and the serrated wall 30 of the casing and the rod is thereby locked firmly in position. Rod 15 is shown in the final clamped position in FIG. 1.

Rod 15 has a hanger 32 attached thereto in which a pipe 33 or any object to be suspended may be held. The supported member 33 in the hanger places a load on rod 15 which tends to tighten the wedge like clamping action achieved between jaw 11 and the wall 30 of the casing. Thus, an extremely tight clamping action is achieved without any significant installation effort or time requirement.

Referring now to FIGS. 3 and 4, a second embodiment of the device of the invention is illustrated. In this embodiment a plurality of freely mounted locking jaws 40a and 40b are utilized in achieving the locking action. Locking jaws 40a and 40b are freely mounted within casing member 43. Casing member 43 which has beveled inner walls 47 is fixedly attached to hanger 32 by welding or any other suitable means. A pipe 33 is shown suspended in hanger 32. A pair of series arranged disc springs 45 are mounted within casing 43 to urge jaws 40a and 40b upwards. Rod 15 is attached to the hanger by inserting it into casing 43 from above. This pushes jaws 40a and 40b downward against spring action of disc springs 45. When rod 15 is then drawn upwards, jaws 40a and 40b slide upwards therewith along the beveled inner walls of casing 43, the inward slope of the walls forcing the jaws against the rod, and serrations 50 formed in the jaws biting into the walls of the rod. With pipe 33 providing a load on hanger 32, the wedge like clamping aciton of the jaws is further enhanced. Two, three, four or more clamping jaws similar to jaws 40a and 40b and which surround rod 15 may be utilized if desired.

The embodiment of FIGS. 3 and 4 may be used in cooperation with the embodiment of FIGS. 1 and 2, the former being utilized as shown in FIGS. 3 and 4 to attach the rod to a suspension hanger while the latter is utilized to connect the rod to a support beam.

The device of this invention thus provides a simple yet highly effective means for tightly securing a suspension member to both a support beam and a suspension hanger with a minimal amount of effort and time being involved in the process. This greatly facilitates operations in large scale construction projects without sacrificing the required support characteristics.

While this invention has been described and illustrated in detail, it is to be clearly understood that this is intended by way of illustration and example only and is not to be taken by way of limitation, the spirit and scope of this invention being limited only by the appended claims.

I claim:

1. A support clamp for holding a rod comprising
    a casing, and
    a jaw freely retained within said casing, one end of said jaw being ball shaped, said one end of said jaw abutting against one wall of said casing, said one wall of said casing being curved to mate with said one end of said jaw to form a pivotal joint therewith, the other end of said jaw being hollowed, said other end of said jaw being adapted to abut against a rod in mating engagement therewith
    whereby a rod may be forced against the wall of said casing opposite said one wall thereof and held in clamping engagement by said clamp.

2. The clamp as recited in claim 1 wherein said other end of said jaw and the wall of said casing opposite said one wall thereof are serrated.

3. In combination, a rod and a support clamp comprising
    a casing, and
    a jaw freely held within said casing at the bottom end thereof, one end of said jaw being ball shaped, said one end of said jaw abutting against the wall portions of said casing at one side of the bottom thereof, said wall portions being shaped to form a pivotal support for said jaw, the other end of said jaw being hollowed to form a curved surface for mating engagement with said rod, said other end of said jaw abutting against said rod thereby forcing said rod against the wall of said casing opposite said one side thereof, said casing having an aperture in the bottom end thereof through which said rod is inserted.

4. A support clamp for holding a rod comprising
    a casing, and
    a jaw freely held within said casing at the bottom thereof, one end of said jaw being ball shaped and abutting against the wall portions of said casing at one end of the bottom thereof, said portions of said casing being curved to mate with said one end of said jaw to form a pivotal ball and socket joint therewith, the other end of said jaw being hollowed to form a mating receptacle for said rod, said casing having an aperture in the bottom thereof opposite the position of the hollowed end of said jaw for receiving a rod, whereby when a rod is inserted through said aperture into said casing, said jaw is pivotally moved upward with the rod and when the rod is then drawn downward, said jaw forces the rod against a wall of said casing into locking engagement therewith.

5. In combination, a rod and a support clamp for holding said rod comprising
    a casing having beveled walls and an aperture at one end thereof, said beveled walls converging towards the top end of said casing,
    a plurality of jaws freely mounted in said casing,
    the outer walls of said jaws being beveled to mate with the beveled walls of said casing, the inner walls of said jaws being serrated,
    a hanger, said casing being fixedly attached to said hanger,
    a pair of series arranged disc springs mounted in said casing at the bottom end thereof, said springs urging said jaws toward the top end of said casing,
    said rod being fitted through the aperture in said casing and being held between said jaws in wedge-like engagement as said rod is drawn away from said casing.

6. In combination, a rod and a support clamp for holding said rod comprising
    a casing having beveled walls and an aperture at one end thereof,
    a plurality of jaws freely mounted in said casing,
    the outer walls of said jaws being beveled to mate with the beveled walls of said casing, the inner walls of said jaws being serrated, and
    spring means mounted in said casing for urging said jaws in a direction substantially parallel to the longitudinal axis of said rod with the outer walls of said jaws abutting against the beveled walls of said casing,
    said rod being fitted through the aperture in said casing and being held between said jaws in wedge-like engagement.

7. The clamp as recited in claim 6 wherein said spring means includes a disc spring positioned between said jaws and the end of said casing opposite said one end thereof.

8. The support clamp as recited in claim 6 and additionally including a hanger, said casing being fixedly attached to said hanger.

References Cited by the Examiner

UNITED STATES PATENTS

| | | | |
|---|---|---|---|
| 545,774 | 9/95 | Clark | 248—59 |
| 581,136 | 4/97 | Preece | 248—412 X |
| 766,890 | 8/04 | Newburg | 248—59 |
| 968,112 | 8/10 | Bernard | 287—114 |
| 2,381,340 | 8/45 | Eastman | 248—412 X |
| 2,454,179 | 11/48 | Hudkins | 248—354 X |
| 2,671,625 | 3/54 | Buckley | 248—58 |
| 2,687,866 | 8/54 | Johnson | 248—361 |

FOREIGN PATENTS

| | | |
|---|---|---|
| 927,146 | 5/55 | Germany. |
| 1,077,354 | 4/54 | France. |

CLAUDE A. LE ROY, *Primary Examiner.*

FRANK L. ABBOTT, *Examiner.*